US012627720B2

(12) United States Patent
Chen et al.

(10) Patent No.: US 12,627,720 B2
(45) Date of Patent: May 12, 2026

(54) SESSION MANAGEMENT METHOD, ENTITY, NETWORK DEVICE, AND STORAGE MEDIUM

(71) Applicant: ZTE CORPORATION, Shenzhen (CN)

(72) Inventors: Lin Chen, Shenzhen (CN); Xiaoying Feng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 112 days.

(21) Appl. No.: 18/575,848

(22) PCT Filed: Jul. 5, 2022

(86) PCT No.: PCT/CN2022/103773
§ 371 (c)(1),
(2) Date: Dec. 31, 2023

(87) PCT Pub. No.: WO2023/280131
PCT Pub. Date: Jan. 12, 2023

(65) Prior Publication Data
US 2024/0372903 A1     Nov. 7, 2024

(30) Foreign Application Priority Data
Jul. 5, 2021     (CN) .......................... 202110754414.3

(51) Int. Cl.
*H04L 65/403*      (2022.01)
*H04L 12/14*       (2024.01)
*H04L 65/1073*     (2022.01)

(52) U.S. Cl.
CPC ........ *H04L 65/403* (2013.01); *H04L 12/1407* (2013.01); *H04L 65/1073* (2013.01)

(58) Field of Classification Search
CPC .......................... H04L 65/403; H04L 12/1407; H04L 65/1073
(Continued)

(56) References Cited

U.S. PATENT DOCUMENTS

2018/0270778 A1* 9/2018 Bharatia ............. H04L 65/1073
2019/0158408 A1* 5/2019 Li ......................... H04W 72/56
(Continued)

FOREIGN PATENT DOCUMENTS

CN          105009613  A      10/2015
CN          110365499  A      10/2019
(Continued)

OTHER PUBLICATIONS

S. Song, C. Lee, H. Cho, G. Lim and J.-M. Chung, "Clustered Virtualized Network Functions Resource Allocation based on Context-Aware Grouping in 5G Edge Networks," in IEEE Transactions on Mobile Computing, vol. 19, No. 5, pp. 1072-1083, May 1, 2020 (Year: 2020).*
(Continued)

*Primary Examiner* — Taylor A Elfervig
(74) *Attorney, Agent, or Firm* — Li & Cai Intellectual Property (USA) Office

(57) ABSTRACT

The present application provides a session management method, an entity, a network device, and a storage medium. The method includes: sending, on the basis of a service requirement, a group-level session management request to a control plane entity, where the group-level session management request carries group information for representing a virtual network group that requires group-level session management; receiving a response message returned by the control plane entity in response to the group-level session management request; and performing, according to content carried in the response message, corresponding session service management on the virtual network group.

9 Claims, 9 Drawing Sheets

(58) Field of Classification Search

USPC .......................................................... 709/224

See application file for complete search history.

(56) References Cited

U.S. PATENT DOCUMENTS

| | | | | |
|---|---|---|---|---|
| 2019/0261260 | A1 * | 8/2019 | Dao | H04W 8/20 |
| 2020/0092424 | A1 * | 3/2020 | Qiao | H04L 12/1407 |
| 2020/0228936 | A1 * | 7/2020 | Talebi Fard | H04W 4/08 |
| 2020/0351980 | A1 * | 11/2020 | Talebi Fard | H04W 76/40 |
| 2020/0374352 | A1 * | 11/2020 | Ge | H04L 67/146 |
| 2021/0014780 | A1 | 1/2021 | Qiao | |
| 2021/0168902 | A1 * | 6/2021 | Wang | H04W 76/11 |
| 2021/0274323 | A1 * | 9/2021 | Xu | H04W 4/08 |
| 2021/0409941 | A1 * | 12/2021 | Rajendran | H04W 80/02 |
| 2022/0060970 | A1 * | 2/2022 | Zhu | H04L 45/566 |
| 2023/0345211 | A1 * | 10/2023 | Chai | H04M 15/41 |

FOREIGN PATENT DOCUMENTS

| | | | |
|---|---|---|---|
| CN | 110381451 A | 10/2019 | |
| CN | 110830925 A | 2/2020 | |
| CN | 111917563 A | 11/2020 | |
| CN | 111953576 A | 11/2020 | |
| CN | 112448875 A | 3/2021 | |
| CN | 112544055 A | 3/2021 | |
| CN | 113207096 A | 8/2021 | |

OTHER PUBLICATIONS

J.-J. Park, S.-J. Lee and H.-K. Kahng, "Multicast Session Management and QoS Management for Multicast Group Communications," 2008 International Conference on Information Networking, Busan, Korea (South), 2008, pp. 1-5 (Year: 2008).*

Kwang-Hui Lee, Jong-Kun Lee and Han-Soo Kim, "A multicast protocol for network management system," Proceedings of IEEE Singapore International Conference on Networks and International Conference on Information Engineering '95, Singapore, 1995, pp. 364-368 (Year: 1995).*

J. Ha and Y.-I. Choi, "Support of a Multi-access Session in 5G Mobile Network," 2019 25th Asia-Pacific Conference on Communications (APCC), Ho Chi Minh City, Vietnam, 2019, pp. 378-383 (Year: 2019).*

M. Sundararajan, S. K. Saraya, S. Ghoshal and B. Ramaswamy, "Managing dynamic group membership in the evolving digital spaces," 2020 International Conference on Smart Technologies in Computing, Electrical and Electronics (ICSTCEE), Bengaluru, India, 2020, pp. 539-543 (Year: 2020).*

J. Kaippallimalil, Y. Lee, T. Saboorian, M. Shalash and U. Kozat, "Traffic Engineered Transport for 5G Networks," 2019 IEEE Conference on Standards for Communications and Networking (CSCN), Granada, Spain, 2019, pp. 1-6 (Year: 2019).*

S. Zoric, J. Barakovic and H. Hodzic, "QoS architecture in IP multimedia subsystem of UMTS," 2008 50th International Symposium ELMAR, Borik Zadar, Croatia, 2008, pp. 253-256. (Year: 2008).*

J.-H. Choi, "Dynamic UE-Grouping Based Interference Management for Ultra-Dense Networks," 2019 IEEE 9th Annual Computing and Communication Workshop and Conference (CCWC), Las Vegas, NV, USA, 2019, pp. 0532-0536 (Year: 2019).*

C. Labonte and S. Srinivas, "Group management strategies for secure multicasting on active virtual private networks," Proceedings 25th Annual IEEE Conference on Local Computer Networks. LCN 2000, Tampa, FL, USA, 2000, pp. 213-222 (Year: 2000).*

S. J. Lee and Y. S. Choi, "GMPS(Group based multi-level packet scheduling) method in multi-beam based mobile communication system," 2015 International Conference on Information and Communication Technology Convergence (ICTC), Jeju, Korea (South), 2015, pp. 1050-1053 (Year: 2015).*

D. Zou, L. T. Yang, W. Qiang, X. Chen and Z. Han, "An Authentication and Access Control Framework for Group Communication Systems in Grid Environment," 21st International Conference on Advanced Information Networking and Applications (AINA '07), Niagara Falls, ON, Canada, 2007, pp. 547-554 (Year: 2007).*

European Patent Office, the Supplementary Partial European Search Report dated May 12, 2025, for corresponding EP application No. 22836882.5.

"3rd Generation Partnership Project; Technical Specification Group Services and System Aspects; Study on enhancement of 5GS for Vertical and LAN Services (Release 16)", 3GPP Draft, pp. 40-44,79-82,84-94, 99-100, issued on Mar. 18, 2019.

"3rd Generation Partnership Project; Technical Specification Group Services and System Aspects; Procedures for the 5G System (5GS); Stage 2 (Release 17)", 3GPP Standard, pp. 102-115,317,384-390,555, issued on Jun. 24, 2021.

WIPO, International Search Report issued on Sep. 22, 2022.

China Patent Office, CN202110754414.3 First Office Action issued on Aug. 10, 2021.

"3rd Generation Partnership Project; Technical Specification Group Services and System Aspects;Study on architectural enhancements for 5G multicast-broadcast services (Release 17)", 3GPP TR 23.757, Oct. 27, 2020.

"3rd Generation Partnership Project; Technical Specification Group Services and System Aspects; Procedures for the 5G System; Stage 2 (Release 16)", 3GPP TS 23.502, Apr. 1, 2019.

Feile Li: "Research and Design on the Overall Solutions of 5G Lightweight Core Networks" issued on Jan. 15, 2020 and the English Abstract.

China Patent Office, CN202110754414.3 Notice of Allowance issued on Aug. 30, 2021.

* cited by examiner

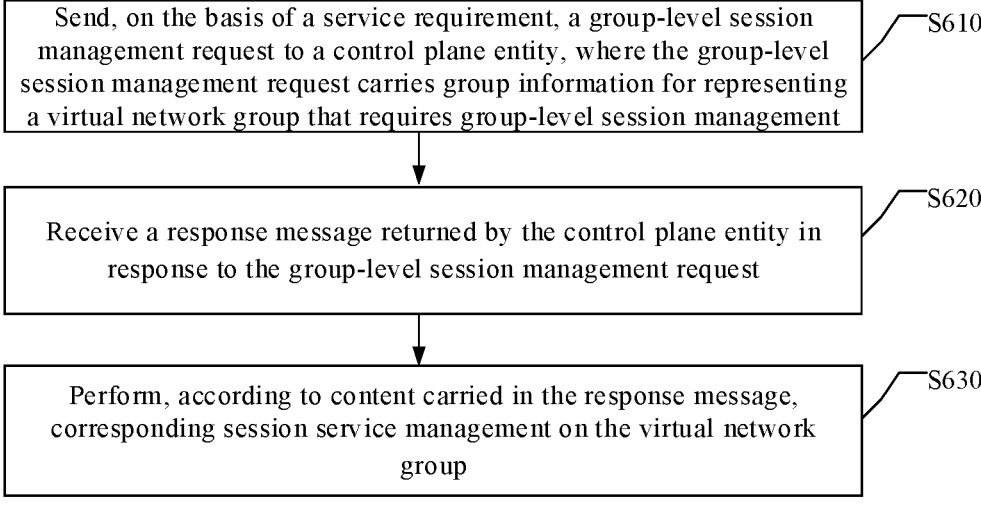

Send, on the basis of a service requirement, a group-level session management request to a control plane entity, where the group-level session management request carries group information for representing a virtual network group that requires group-level session management S610

Receive a response message returned by the control plane entity in response to the group-level session management request S620

Perform, according to content carried in the response message, corresponding session service management on the virtual network group S630

FIG. 6

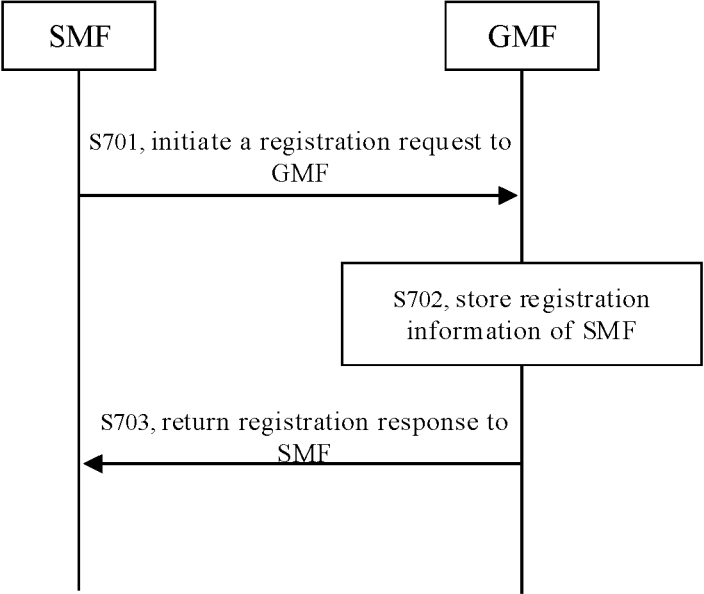

SMF

GMF

S701, initiate a registration request to GMF

S702, store registration information of SMF

S703, return registration response to SMF

FIG. 7

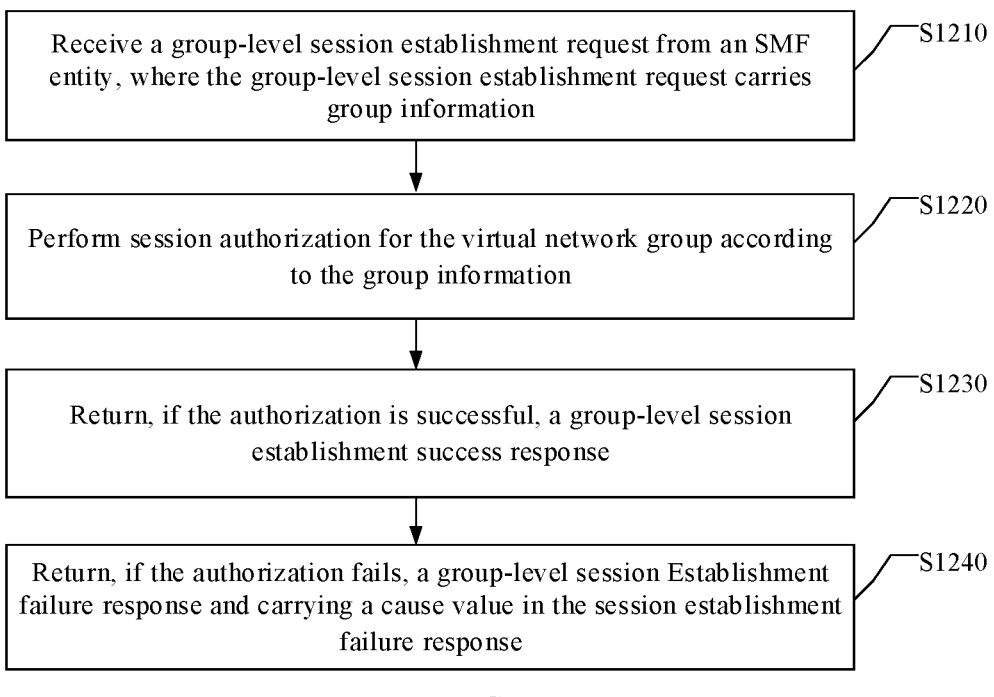

Receive a group-level session establishment request from an SMF entity, where the group-level session establishment request carries group information ⟋ S1210

Perform session authorization for the virtual network group according to the group information ⟋ S1220

Return, if the authorization is successful, a group-level session establishment success response ⟋ S1230

Return, if the authorization fails, a group-level session Establishment failure response and carrying a cause value in the session establishment failure response ⟋ S1240

FIG. 12

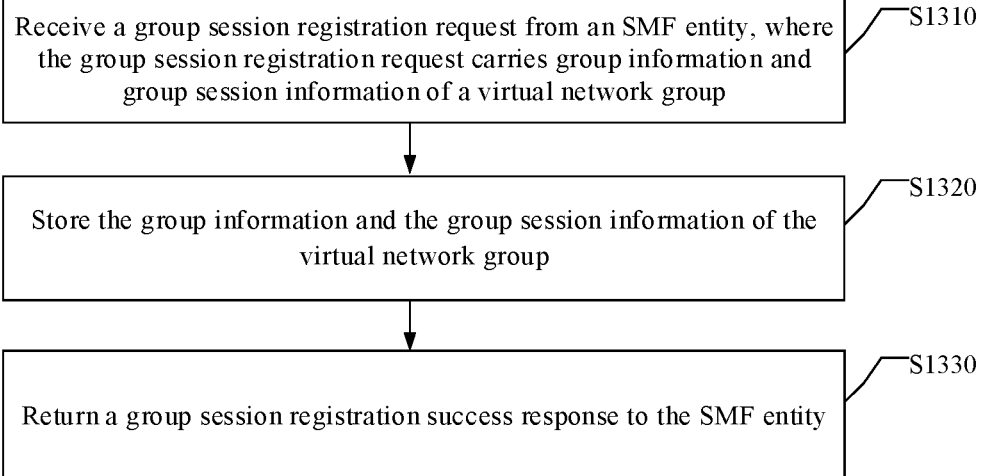

Receive a group session registration request from an SMF entity, where the group session registration request carries group information and group session information of a virtual network group ⟋ S1310

Store the group information and the group session information of the virtual network group ⟋ S1320

Return a group session registration success response to the SMF entity ⟋ S1330

FIG. 13

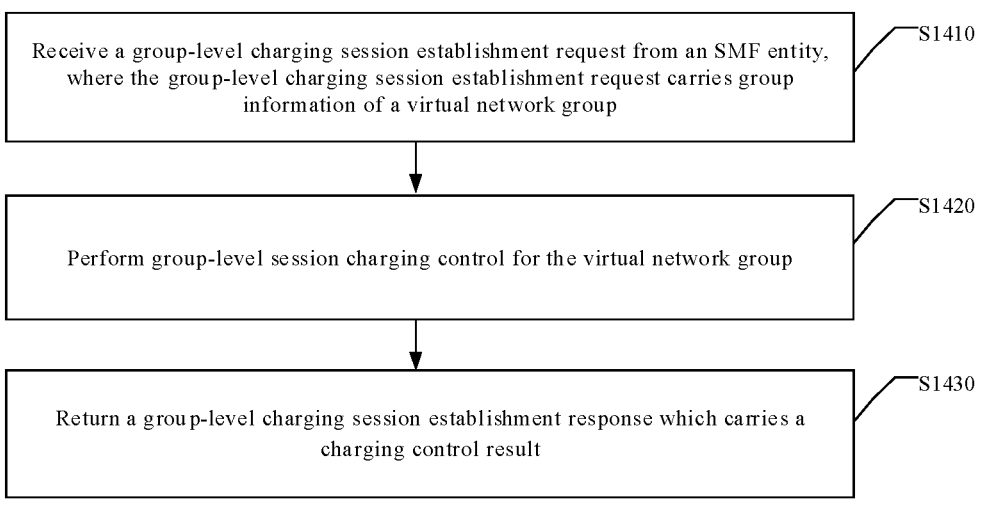

Receive a group-level charging session establishment request from an SMF entity, where the group-level charging session establishment request carries group information of a virtual network group — S1410

Perform group-level session charging control for the virtual network group — S1420

Return a group-level charging session establishment response which carries a charging control result — S1430

FIG. 14

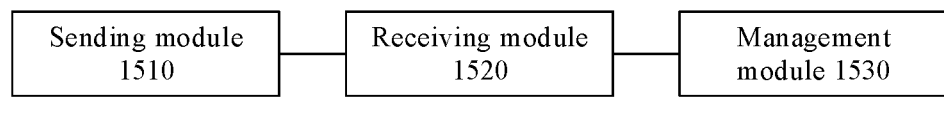

Sending module 1510 — Receiving module 1520 — Management module 1530

FIG. 15

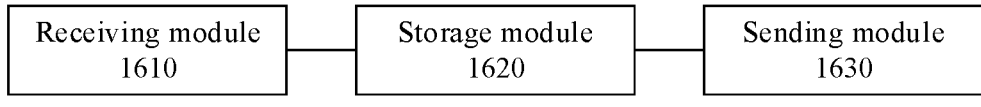

Receiving module 1610 — Storage module 1620 — Sending module 1630

FIG. 16

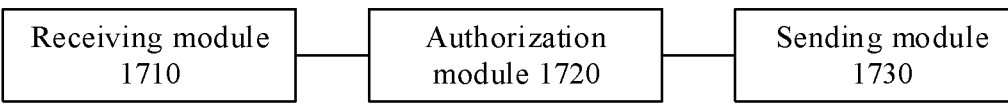

Receiving module 1710 — Authorization module 1720 — Sending module 1730

FIG. 17

SESSION MANAGEMENT METHOD, ENTITY, NETWORK DEVICE, AND STORAGE MEDIUM

CROSS-REFERENCE TO RELATED APPLICATIONS

The present disclosure is a National Phase Application filed under 35 U.S.C. 371 as a national stage of PCT/CN2022/103773, filed on Jul. 5, 2022, an application claiming priority to Chinese patent application No. 202110754414.3 filed on Jul. 5, 2021, the entirety contents of which are incorporated hereby by reference.

TECHNICAL FIELD

The present application relates to the field of mobile communications, and in particular relates to a session management method, an entity, a network device and a storage medium.

BACKGROUND

The mobile communication has now progressed to the 5th generation (5G) phase. Compared with the previous generations, the network architecture of 5G is mainly characterized by the service-based architecture. How to utilize virtual network (VN) group functions by a 5G Network has become one of the most promising technologies in the related stage.

In the existing art under the current 5G communication scenarios, policy control and charging are typically performed based on the session granularity of the protocol data unit (PDU). For group users, local area network (LAN) services should be offered to the whole group for terminal-by-terminal control and management, which is difficult in terms of group control and results in poor group processing performance.

SUMMARY

An embodiment of the present application provides a session management method applicable to a session management function (SMF) entity, including: sending, on the basis of a service requirement, a group-level session management request to a control plane entity, wherein the group-level session management request carries group information for representing a virtual network group that requires group-level session management; receiving a response message returned by the control plane entity in response to the group-level session management request; and performing, according to content carried in the response message, corresponding session service management on the virtual network group.

An embodiment of the present application further provides a session management method applicable to a group management function (GMF) entity, including: receiving a registration request from a session management function (SMF) entity, wherein the registration request carries a supported data network name and supported virtual network group information; storing the data network name and the virtual network group information; and returning a registration response to the SMF entity.

An embodiment of the present application further provides a session management method applicable to a policy control function (PCF) entity, including: receiving a group-level session establishment request from a session management function (SMF) entity, wherein the group-level session establishment request carries group information of a virtual network group; perform session authorization for the virtual network group according to the group information; returning, in a case where the authorization is successful, a group-level session establishment success response, and returning, in a case where the authorization fails, a group-level session establishment failure response and carrying a cause value in the session establishment failure response.

An embodiment of the present application further provides a session management method applicable to a unified data management function (UDM) entity, including: receiving a group session registration request from a session management function (SMF) entity, wherein the group session registration request carries group information and group session information of a virtual network group; storing the group information and the group session information of the virtual network group; and returning a group session registration success response to the SMF entity.

An embodiment of the present application further provides a session management method applicable to a charging function (CHF) entity, including: receiving a group-level charging session establishment request from a session management function (SMF) entity, wherein the group-level charging session establishment request carries group information of a virtual network group; performing group-level session charging control for the virtual network group; and returning a group-level charging session establishment response, wherein the group-level charging session establishment response carries a charging control result.

An embodiment of the present application further provides a session management function (SMF) entity, including: a sending module configured to send, on the basis of a service requirement, a group-level session management request to a control plane entity, wherein the group-level session management request carries group information for representing a virtual network group that requires group-level session management; a receiving module configured to receive a response message returned by the control plane entity in response to the group-level session management request; and a management module configured to perform, according to content carried in the response message, corresponding session service management on the virtual network group.

An embodiment of the present application further provides a group management function (GMF) entity, including: a receiving module configured to receive a registration request from a session management function (SMF) entity, wherein the registration request carries a supported data network name and supported virtual network group information; a storage module configured to store the data network name and the virtual network group information; and a sending module configured to return a registration response to the SMF entity.

An embodiment of the present application further provides a policy control function (PCF) entity, including: a receiving module configured to receive a group-level session establishment request from a session management function (SMF) entity, wherein the group-level session establishment request carries group information of a virtual network group; an authorization module configured to perform session authorization for the virtual network group according to the group information; a sending module configured to return, in a case where the authorization is successful, a group-level session establishment success response, and further configured to return, in a case where the authorization fails, a group-level session establishment failure response and carry a cause value in the session establishment failure response.

An embodiment of the present application further provides a unified data management function (UDM) entity, including: a receiving module configured to receive a group session registration request from a session management function (SMF) entity, wherein the group session registration request carries group information and group session information of a virtual network group; a storage module configured to store the group information and the group session information of the virtual network group; and a sending module configured to return a group session registration success response to the SMF entity.

An embodiment of the present application further provides a charging function (CHF) entity, including: a receiving module configured to receive a group-level charging session establishment request from a session management function (SMF) entity, wherein the group-level charging session establishment request carries group information of a virtual network group; a control module configured to perform group-level session charging control for the virtual network group; and a sending module configured to return a group-level charging session establishment response, wherein the group-level charging session establishment response carries a charging control result.

An embodiment of the present application further provides a network device, including: one or more processors; and a memory having one or more programs stored thereon which, when executed by the one or more processors, cause the one or more processors to implement any one of the session management methods described in the embodiments of the present application.

An embodiment of the present application provides a non-transitory computer-readable storage medium having a computer program stored thereon which, when executed by a processor, causes any one of the session management methods described in the embodiments of the present application to be implemented.

With respect to the above embodiments and other aspects of the present application and implementations thereof, further description is provided in the brief description of drawings, the detailed description of embodiments, and the claims.

BRIEF DESCRIPTION OF DRAWINGS

FIG. 6 shows a flowchart of a session management method according to an embodiment of the present application.

FIG. 7 shows a flowchart of one SMF entity registering with a GMF entity according to an embodiment of the present application.

FIG. 12 shows a schematic flowchart of a session management method according to another embodiment of the present application.

FIG. 13 shows a schematic flowchart of a session management method according to another embodiment of the present application.

FIG. 14 shows a schematic flowchart of a session management method according to another embodiment of the present application.

FIG. 15 shows a schematic structural diagram of an SMF entity according to an embodiment of the present application.

FIG. 16 shows a schematic structural diagram of a GMF entity according to an embodiment of the present application.

FIG. 17 shows a schematic structural diagram of a PCF entity according to an embodiment of the present application.

DETAIL DESCRIPTION OF EMBODIMENTS

For clarity and better understanding of the objects, technical solution and advantages of the application, embodiments of the present application will now be described in detail in conjunction with the accompanying drawings. It should be noted that the embodiments of the present application and features therein may be combined with each other in any manner as long as they are not contradictory.

Figure 1:
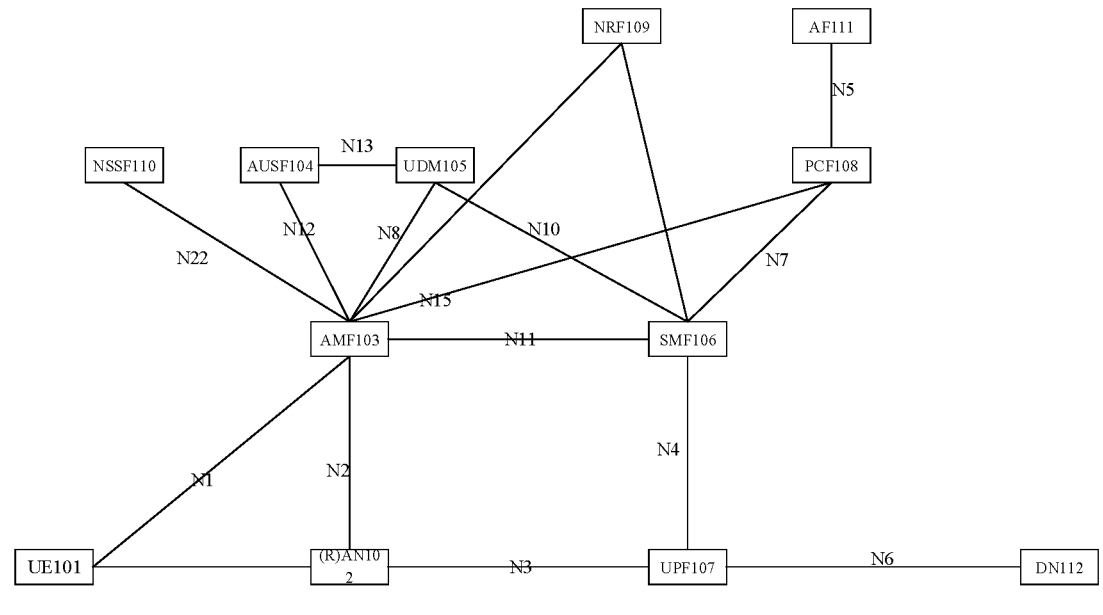
FIG. 1 shows a schematic diagram of a network architecture of a 5G communication system according to an embodiment of the present application.

FIG. 1 shows a schematic diagram of a network architecture of a 5G communication system according to an embodiment of the present application.

As shown in FIG. 1, the network architecture of the communication system includes, but is not limited to: a user equipment (UE) 101, a radio access network (RAN) 102, an access and mobility management function (AMF) 103, an authentication server function (AUSF) 104, a unified data management function (UDM) 105, a session management function (SMF) 106, a user plane function 107, a policy control functionality (PCF) 108, an NF repository function (NRF) 109, a network slice selection function (NSSF) 110, an application function (AF) 111, and a data network (DN) 112.

The UE 101 may access the 5G network through a wireless air interface and obtain services. The terminal may exchange information with a base station through air inter-face, and exchange information with the AMF 103 of a core network through non-access stratum (NAS) signaling.

The RAN 102 is responsible for air interface resource scheduling and air interface connection management for the UE 101 to access the network.

The AMF 103 is a core network control plane entity mainly responsible for: user mobility management, includ-ing registration and temporary ID allocation; maintaining IDLE and CONNECT states and state transitions; switching in a CONNECT state; triggering paging in a user IDLE state, and the like.

The AUSF 104 is a core network control plane entity mainly responsible for authentication and authorization of a user to ensure that the user is valid.

The UDM 105 is a core network control plane entity (home subscriber server) responsible for storing user sub-scription data permanently.

The SMF 106 is a core network control plane entity mainly responsible for maintaining a protocol data unit (PDU) session, allocating user internet protocol (IP) addresses. The SMF 106 has functions of controlling quality of service (QoS) as well as charging; and having functions of caching downlink data messages received in the user IDLE state and informing the AMF 103 to page the user, and the like.

The UPF 107 is a core network user plane function entity, and is responsible for forwarding user data messages, count-ing the user data messages for charging, and the like.

The PCF 108 is a core network control plane entity and a function entity responsible for access and mobility manage-ment policies, UE policies, session management policies, and charging rules. According to the service information, the user subscription information, and configuration informa-tion of an operator, this function entity produces an access and mobility management policy, a UE routing selection policy, a Qos rule and a charging rule for user data trans-mission, and the like.

The NRF 109 is a core network control plane entity responsible for dynamic registration of service capabilities of network functions and network function discovery.

The NSSF 110 is a core network control plane entity responsible for selection of a target network slice instance (NSI).

The AF 111 is an application entity responsible for offering specific services to users.

The DN 112 may be used to provide a service data network, such as a data network corresponding to an opera-tor service, internet access, a third party service, and the like.

In some embodiments, the communication system may further include: a binding support function (BSF) and a network exposure function (NEF).

The BSF may query the PCF where a session is located according to session information, such as an IP address or a media access control (MAC) address, and the NF protocol function is extended in this patent to query information of the SMF or UPF where the session is located.

The NEF is a core network control plane entity respon-sible for exposure of the mobile network capabilities to the outside.

In FIG. 1, the network architecture further includes ref-erence points as follows:

N1: a reference point between a UE and an AMF;
N2: a reference point between an (R) AN and an AMF;
N3: a reference point between an (R) AN and a UPF;
N4: a reference point between an SMF and a UPF;
N5: a reference point between a CF and an AF;

N6: a reference point between a PSA UPF and a data network;
N7: a reference point between an SMF and a PCF;
N8: a reference point between a UDM and an AMF;
N10: a reference point between a UDM and an SMF;
N11: a reference point between an AMF and an SMF;
N12: a reference point between an AMF and an AUSF;
N13: a reference point between a UDM and an AUSF;
N15: a reference point between a PCF and an AMF in a non-roaming scenario, or a reference point between a PCF and an AMF at a visited place in a roaming scenario; and
N22: a reference point between an AMF and an NSSF.

In some description of the embodiments herein below, the AMF entity may be referred to as AMF, the AUSF entity may be referred to as AUSF, the UDM entity may be referred to as UDM, the SMF entity may be referred to as SMF, the UPF entity may be referred to as SMF, the PCF entity may be referred to as PCF, the NRF entity may be referred to as NRF, the NSSF entity may be referred to as NSSF, and the AF entity may be referred to as AF.

Figure 2:
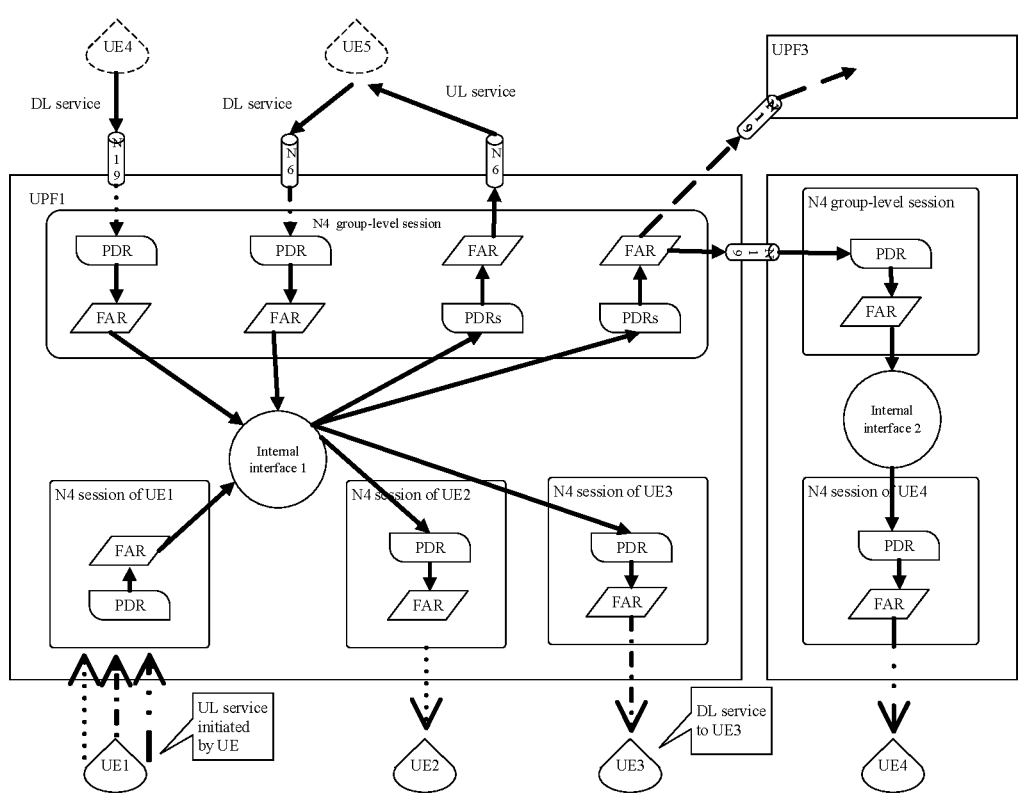
FIG. 2 shows a schematic diagram of a communication mode of a user equipment in a 5G VN group in a 5G communication scenario according to an embodiment of the present application.

FIG. 2 shows a schematic diagram of a communication mode of a user equipment in a 5G VN group in a 5G communication scenario.

In FIG. 2, user equipments in a 5G VN group, such as UE1, UE2, UE3, UE4 and UE5, are exemplarily shown. Among them, UE1, UE2, UE3, and UE5 are associated with UPF1, UE4 is associated with UPF2, and UE5 is associated with UPF3.

In some embodiments, the 5G VN group communication includes one-to-one communication and one-to-many com-munication. The one-to-one communication supports uni-cast traffic forwarding between two UEs in the 5G VN, or between one UE and a device on the DN. The one-to-many communication supports forwarding of multicast and broad-cast traffic from one UE (or a device on the DN) to multiple or all UEs in the 5G VN and devices on the DN.

As shown in FIG. 2, according to forwarding paths, the 5G VN group communication may include three statistical modes: a local switch mode, an N6-based communication mode (N6), and an N19-based communication mode (N19).

According to the local switch mode, in a case where the current UPF is a UPF of a common PDU session anchor (PSA) of different PDU sessions in the same 5G VN group, the data traffic is locally switched via the single UPF.

According to N6, up line (UL)/down line (DL) services of the 5G VN communication are forwarded to or from the DN.

According to N19, UL/DL communication for the 5G VN group communication is forwarded between PSA UPFs of different PDU sessions through N19. N19 is based on a shared user plane tunnel of PSA UPFs sharing a single 5G VN group. N19 is a reference point between two PSA UPFs of a 5G LAN type service.

In FIG. 2, the 5G VN group includes a UPF internal interface, such as a VN internal interface 1 and a VN internal interface 2. As can be seen from FIG. 2, regardless of the communication mode, the UPF internal interface and the following two-operation detection and forwarding process are desired so as to implement traffic forwarding in the 5G VN group.

In a first operation, a data packet received from any 5G VN group member (in communication via a PDU session, N6 or N19) is forwarded to an associated UPF internal interface (i.e., a target interface of the data packet is set to a 5G VN internal interface).

In a second operation, a PDR installed on the UPF internal interface (i.e., a source interface of the data packet is set to a 5G VN internal interface) detects and forwards the data packet to a corresponding 5G VN group member (in the corresponding communication mode).

As shown in FIG. 2, in the current 5G communication scenario, communication among the group user equipments relies on the PDR and FAR instructions delivered by the SMF via an N4 interface. Therefore, a challenge is posed to N4 signaling interaction when there are too many users in the group, which is especially aggravated by the existing Ethernet packet filter which can only support to carry 16 MAC addresses and the IP filter which can only carry 4 IP addresses. In a case where a user frequently logins on and off or moves, the PDR/FAR of the session has to be constantly modified, which increases the performance consumption of the system.

In an embodiment of the present application, a scheme for establishing a group-level session and performing unified management with an SMF is provided.

Figure 3:
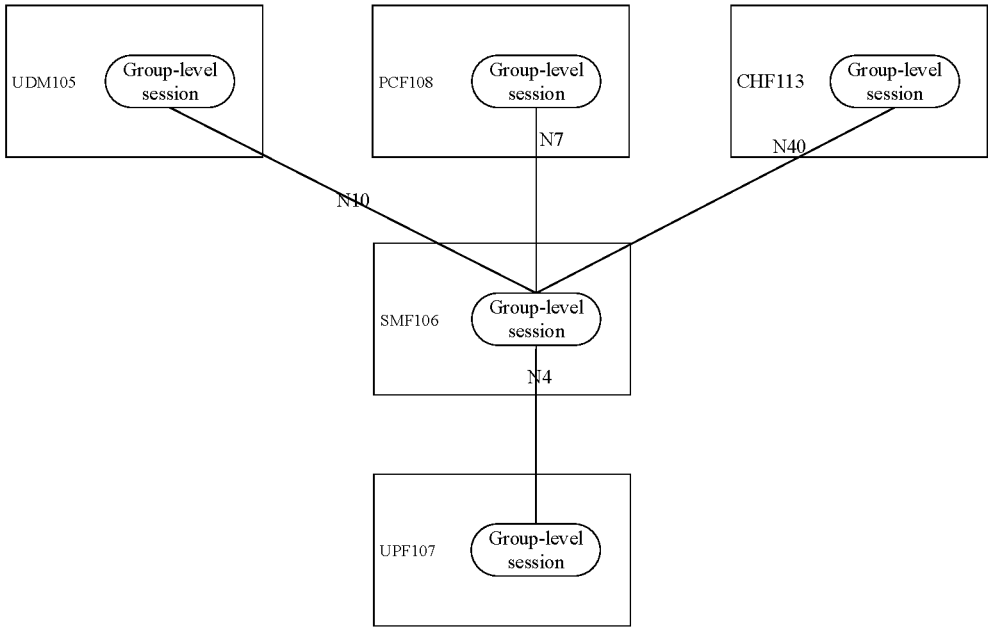
FIG. 3 shows a schematic diagram of an architecture of group-level session management according to an embodiment of the present application.

FIG. 3 shows a schematic diagram of an architecture of group-level session management according to an embodiment of the present application. The same reference numerals in FIG. 3 as in FIG. 1 indicate the same structures. As shown in FIG. 3, the architecture includes: a UDM 105, an SMF 106, a UPF 107, a PCF 108 and a charging function (CHF) 113.

As shown in FIG. 3, the UDM 105 may perform unified authorization on group sessions; the PCF 108 may perform unified policy control over the group, and the CHF 113 may perform unified charging over the group.

In some scenarios, an AMF, a BSF (not shown in the figure), or the like may query group-level sessions to obtain group information of a virtual network group, such as locations of the SMF 106 and the UPF 107, a group session type, a multicast address, or the like.

Figure 4:
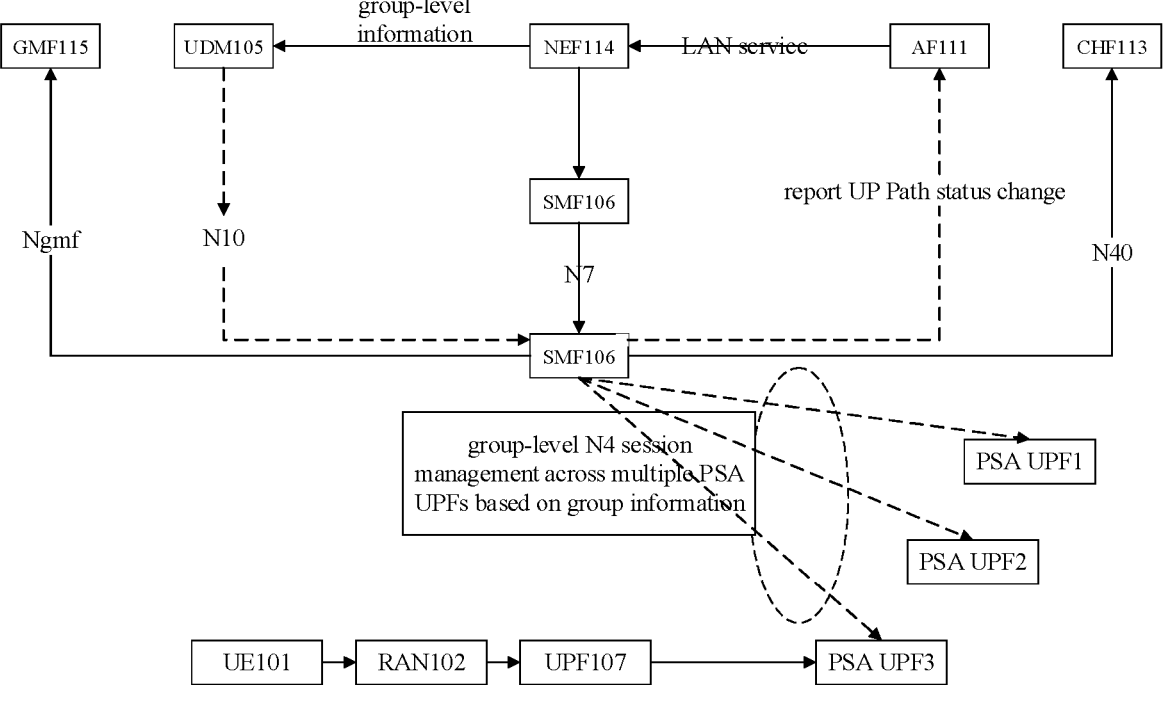
FIG. 4 shows a schematic diagram of a scenario of group-level session management in an embodiment of the present application.

FIG. 4 shows a schematic diagram of a scenario of group-level session management in an embodiment of the present application. The same reference numerals in FIG. 4 as in FIGS. 1 and 3 indicate the same structures. Functions of each function entity related to group services will be described below with reference to FIG. 4.

The AF 111, having a capability of automatically opening an LAN service, may specify an LAN capability of a UE, include an N6 tunnel endpoint, and track transmission path information of a UE LAN session.

The SMF 106 is responsible for group-level N4 session management across multiple protocol data unit session anchor (PSA) UPFs, and reporting up line (UL) path change information to the AF 111.

The PCF 108 supports group delivery; supports establishment of a group-level session, and notifies the SMF 106 when subscription changes.

The CHF 113 adds VN group information to a user phone bill to facilitate filtering; and adds a group-level session charging function.

The NEF 114 supports intervention in an LAN service at the AF 111 side via an NEF 114 network exposure interface.

The GMF 115 supports registration and discovery of group information.

As shown in FIG. 4, the definition of the group-level session may be extended through interfaces like N7, N10, N40, etc., to facilitate the SMF to initiate group-level session registration to the UDM 105 and establish a group-level N7 policy and an N40 charging session, while the subsequent UDM 105, PCF 108, and CHF 113 may also directly perform unified control on the group-level sessions.

Figure 5:
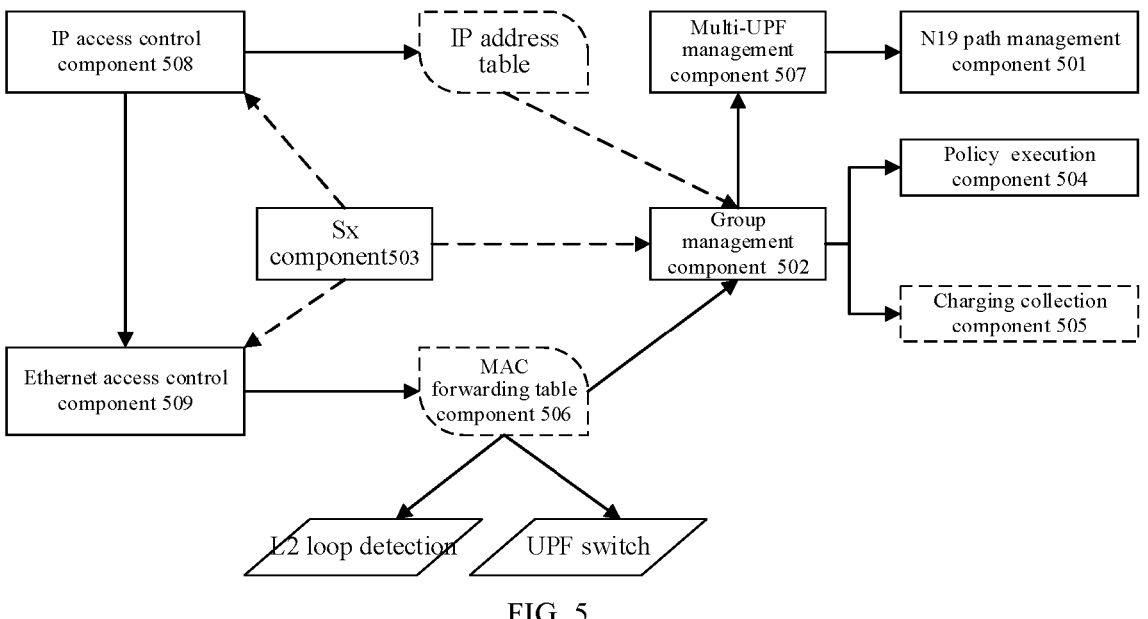
FIG. 5 shows a schematic diagram of internal components of an SMF entity according to an embodiment of the present application.

FIG. 5 shows a schematic diagram of internal components of an SMF entity according to an embodiment of the present application. In FIG. 5, the SMF 106 may include: a group management component 502, an N19 path management component 501, a session context (Sx) component 503, a policy execution component 504, a charging collection component 505, a MAC forwarding table component 506, a multi-UPF management component 507, an IP access control component 508, and an Ethernet access control component 509.

The group management component 502 is configured to maintain a group table, and manage group-level sessions. The N19 path management component 501 is configured to establish UP group-level tunnels, and modify and delete messages, and it requires to integrate Sx component modules. The Sx component 503 is configured to generate N4 session messages, and assemble individual rules. The policy execution component 504 is configured to interface with the PCF and execute a group-level session policy. The charging collection component 505 is configured to collect charging information of a group-level session and report the charging information to the CHF. The MAC forwarding table component 506 is configured to generate a forwarding relationship table based on the MACs reported by the UPF. The multi-UPF management component 507 is configured to maintain multi-UPF information management in when the group crosses multiple UPFs. The IP access control component 508 is configured to control access of an IP type session. The Ethernet access control component 509 is configured to control access of an Ethernet type session.

FIG. 6 shows a flowchart of a session management method according to an embodiment of the present application. As shown in FIG. 6, the session management method includes the following operations S610 to S630.

At operation S610, sending, on the basis of a service requirement, a group-level session management request to a control plane entity, wherein the group-level session management request carries group information for representing a virtual network group that requires group-level session management.

At operation S620, receiving a response message returned by the control plane entity in response to the group-level session management request.

At operation S630, performing, according to content carried in the response message, corresponding session service management on the virtual network group.

According to the session management method provided in the embodiments of the present application, the SMF can send, on the basis of a service requirement, a group-level session management request to a control plane entity, where the group-level session management request carries group information so that the session management can be performed for the whole group, thereby meeting the service requirement of unified control of the group-level sessions, reducing the difficulty in group control and reducing messages at the N7 and N40 interfaces, and achieving the effect of improving the group processing performance.

In some embodiments, before the operation S610, the session management method further includes the following operations S11 to S12.

At operation S11, initiating a registration request to a group management function (GMF) entity, where the registration request carries a supported data network name and supported virtual network group information. At operation S12, receiving a registration response returned by the GMF entity in response to the registration request.

In this embodiment, the SMF supports static 5G LAN configuration, and registers with the GMF entity when the SMF is powered on or the configuration is updated.

FIG. 7 shows a flowchart of the SMF entity registering with the GMF entity according to an embodiment of the present application. As shown in FIG. 7, the SMF entity registering with the GMF entity may include the following operations S701 to S703.

At operation S701, the SMF entity initiates a registration request to the GMF entity.

In this operation, the registration information (SmfInfo) carried in the registration request contains a data network name (DNN) and supported virtual network group information.

At operation S702, the GMF entity stores the registration information.

At operation S703, the GMF entity returns a registration response to the SMF entity.

In this embodiment of the present application, after the SMF entity successfully registers with the GMF entity, when the SMF entity is subsequently discovered from the GMF entity by the AMF entity, the GMF entity may select a preferred SMF for access according to the DNN and the group information. When the SMF is down abnormally, the GMF removes the most preferred SMF and selects a second preferred SMF as a new preferred SMF, and records the new preferred SMF to maintain the record.

In some embodiments, the control plane entity is a policy control function (PCF) entity.

In this embodiment, the operation of sending, on the basis of the service requirement, the group-level session management request to the control plane entity in S610 may specifically include: sending a group-level session establishment request to the PCF entity, where the group-level session establishment request carries group information for the PCF entity to perform session authorization on the virtual network group.

The operation S620 may specifically include: receiving a group-level session establishment success response returned by the PCF entity in response to the group-level session establishment request; where the group-level session establishment success response carries group session policy information.

The operation S630 may specifically include: performing, according to content carried in the response message, corresponding session service management on the virtual network group, which includes: S21, executing the group session policy information to establish a group-level session for the virtual network group; and S22, returning a policy execution response for executing the group session policy information to the PCF entity.

In this embodiment, the SMF entity can initiate a request to the PCF to establish a group-level session policy control, thereby achieving a group unified policy.

In some embodiments, after the operation S620, the session management method further includes: receiving a group-level session establishment failure response returned by the PCF entity in response to the group-level session establishment request, where the group-level session establishment failure response carries a cause value; and determining a cause for the group-level session establishment failure according to the cause value.

In this embodiment, in a case where the PCF entity performs group session authorization on the SMF and fails, the PCF entity returns a cause value to the SMF entity to indicate the detailed cause for the authorization failure by the cause value. Exemplarily, the cause value may be a protocol status code, such as a hypertext transfer protocol (HTTP) status code, for example, a status code beginning with the number 4 or 5. A status code "4XX" beginning with the number 4 may represent a client error status code, indicating the detailed cause being that the server cannot process the request. A status code "5XX" beginning with the number 5 may represent a server error status code, indicating the detailed cause being that a server processing request error.

In some embodiments, after establishing the group-level session for the virtual network group in the operation S21, the session management method further includes the following operations S31 to S33.

At operation S31, receiving a policy change notification sent from the PCF entity, where the policy change notification carries changed session policy information, and the policy change notification is a notification message sent from the PCF entity according to an instruction of an application entity.

At operation S32, executing the changed session policy information to modify the group-level session for the virtual network group.

At operation S33, returning a policy execution response for executing the changed session policy information to the PCF entity.

In this embodiment, in a case where there is a change in the virtual network group information and, for example, the PCF receives an instruction from the AF, the PCF directly delivers the policy change notification to the group-level session, to improve the control capability of the group-level session.

Figure 8:
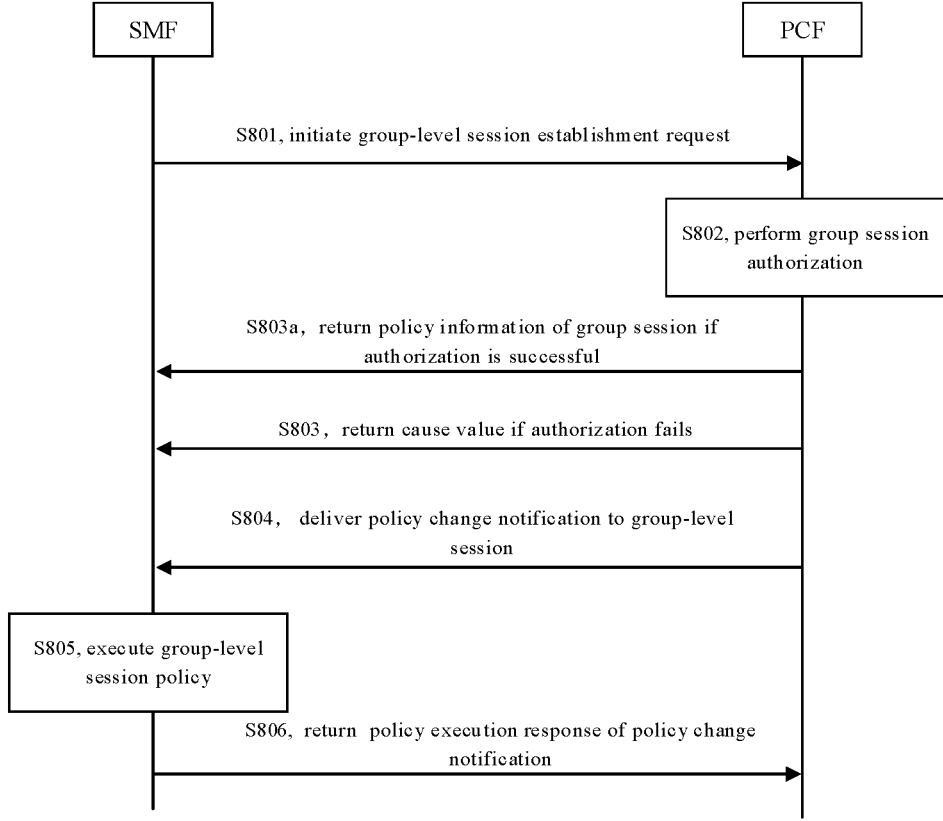
FIG. 8 shows a flowchart of one SMF establishing a group-level session policy control session according to an embodiment of the present application.

FIG. 8 shows a flowchart of an SMF establishing a group-level session policy control session according to an embodiment of the present application. As shown in FIG. 8, the SMF establishing the group-level session policy control session may include the following operations S801 to S806.

At operation S801, when a virtual network group associated with the SMF entity has a user equipment, the SMF entity initiates a group-level session establishment request carrying group information of the virtual network group to the PCF entity.

At operation S802, the PCF entity performs group session authorization.

At operation S803*a*, if the authorization is successful, the PCF entity returns policy information of the group session.

At operation S803*b*, if the authorization fails, the PCF entity returns a 4xx or 5xx cause value that carries the detailed cause value.

At operation S804, the PCF entity directly delivers a policy change notification (Sm Policy Notification) to the group-level session.

In this operation, the policy change notification carries changed session policy information.

In some scenarios, in a case where there is a change in the virtual network group information and, for example, the PCF entity receives an instruction from the AF entity, the PCF entity directly delivers the policy change notification to the group-level session.

At operation S805, the SMF entity executes the group-level session policy, including, for example, notifying the UPF entity to modify the group-level session.

At operation S806, the SMF entity returns a policy execution response of the policy change notification.

In the present application, by establishing the group-level session policy control session, a group-level unified control capability is provided, the difficulty in group control is reduced, and a group unified policy is achieved.

In some embodiments, the control plane entity is a unified data management function (UDM) entity.

In this embodiment, the operation S610 may specifically include: sending a group session registration request to the UDM entity.

The group session registration request carries the group information and group session information, so that when a new user equipment accesses the virtual network group, an access and mobility management function (AMF) obtains, via the UDM entity, the group session information of the virtual network group and discovers a serving SMF entity.

The operation S620 may specifically include: receiving a group session registration success response sent from the UDM entity in response to the group session registration request.

In this embodiment, the AMF entity is used as a core network control plane entity responsible for user mobility management. The SMF entity registers the group session to the AMF entity so that when a new user accesses the LAN subsequently, the AMF can obtain the group-level session information through the UDM entity and discover a serving SMF, thereby improving the control capability of the group-level session.

Figure 9:
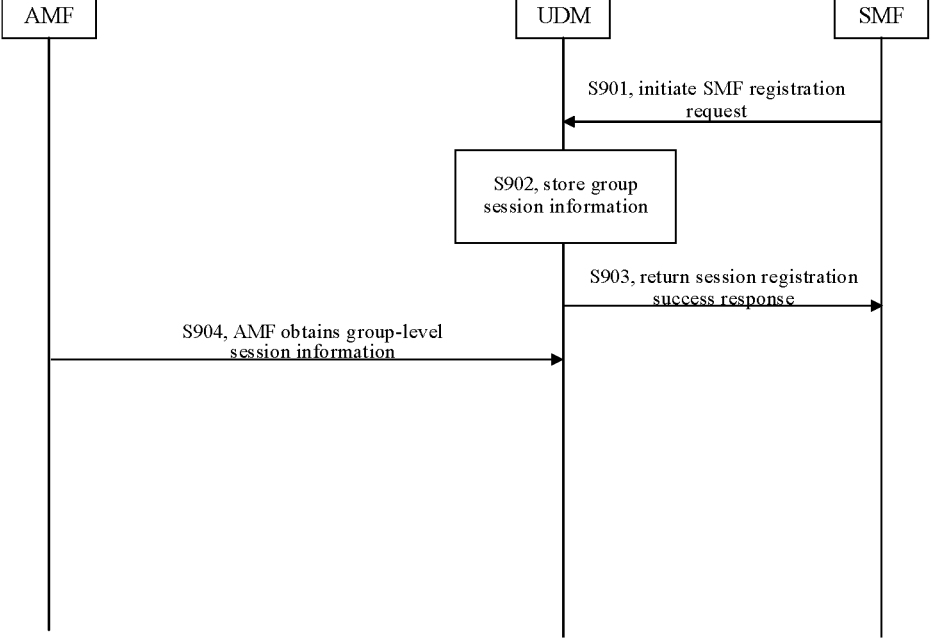
FIG. 9 shows a schematic flowchart of an SMF initiating a group session registration to a UDM according to an embodiment of the present application.

FIG. 9 shows a schematic flowchart of an SMF initiating a group session registration to a UDM according to an embodiment of the present application. As shown in FIG. 9, the flow may include the following operations S901 to S904.

At operation S901, the SMF entity initiates a group session registration request (SMF registration) to the UDM entity.

At operation S902, the UDM entity stores the group session information.

At operation S903, the UDM entity returns a session registration success response.

At operation S904, when a new user accesses the LAN, the AMF obtains the group-level session information through the UDM entity and discovers a serving SMF.

In the embodiment of the present application, with the SMF initiating the group session registration to the UDM, the group processing performance can be improved, and the service requirement of unified control of the group-level sessions can be met.

In some embodiments, the control plane entity is a charging function (CHF) entity.

In this embodiment, the operation S610 may specifically include: sending a group-level charging session establishment request to the CHF entity, where the group-level charging session establishment request carries the group information, and the group-level charging session is used for requesting the CHF entity to perform charging control on the group-level session of the virtual network group.

The operation S620 may specifically include: receiving a group-level charging session establishment response returned by the CHF entity in response to the group-level charging session establishment request.

In this embodiment, with the SMF initiating the group-level charging session request to the CHF entity, the CHF can charge the whole group, so that the control capability of charging for the group-level session is addressed, and the difficulty in group control is reduced, thereby achieving group unified charging control and meeting the service requirement of unified control of the group-level sessions.

In some embodiments, after the operation S620, the session management method further includes the following operations S31 to S33.

At operation S31, receiving a policy modify notification request sent from the CHF entity, where the policy modify notification request carries the group information and group-level quota modify policy information.

At operation S32, executing the group-level quota modify policy information on the group-level session of the virtual network group.

At operation S33, returning a policy modify notification response to the CHF entity, where the policy modify notification response carries an execution result of the group-level quota modify policy information.

In this embodiment, based on the policy modify notification request sent from the CHF entity, the SMF can execute the group-level quota modify policy and return the execution result of the group-level quota modify policy. In this manner, the group information is delivered to the SMF only once, which reduces the difficulty in group control and improves the group processing performance.

Figure 10:
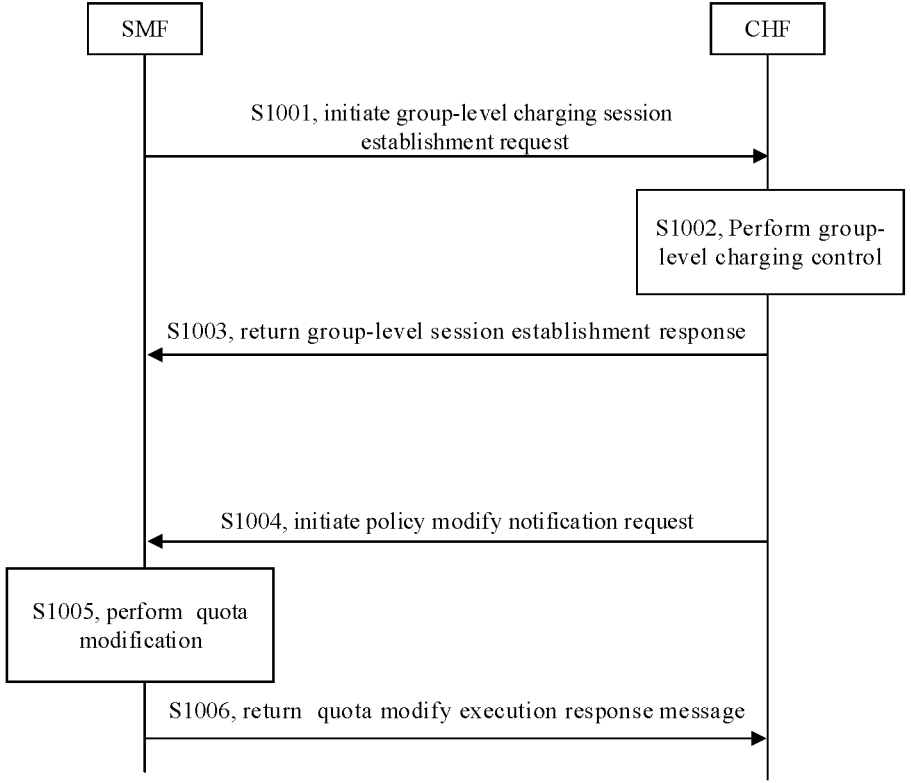
FIG. 10 shows a schematic flowchart of an SMF initiating establishment of a group-level charging session to a CHF according to an embodiment of the present application.

FIG. 10 shows a schematic flowchart of an SMF initiating establishment of a group-level charging session to a CHF according to an embodiment of the present application. As shown in FIG. 10, the flow of the SMF initiating establishment of the group-level charging session to the CHF may include the following operations S1001 to S1006.

At operation S1001, the SMF initiates a group-level charging session establishment request (Nchf_Converged-Charging_Create Request) to the CHF.

In this operation, when a user appears in the virtual network group, the SMF initiates a group-level charging session establishment request to the CHF.

At operation S1002, the CHF performs group-level session charging control.

At operation S1003, CHF returns a group-level session establishment response (Nchf_ConvergedCharging_Create Response).

At operation S1004, in a case where the CHF decides to modify the group-level quota, a policy modify notification request (Nchf_ConvergedCharging_Notify Request) is initiated to the SMF.

At operation S1005, the SMF performs quota modification.

Exemplarily, the group-level charging control may include modifying a quota, or terminating a session.

At operation S1006, the SMF returns a quota modify execution response message (Nchf_Converged-Charging_Notify Response) carrying an execution result of the quota modification.

In the embodiment of the present application, the CHF entity notifies the SMF entity to update the session through a flow the same as or equal to that of the PCF, and details are not repeated here.

According to the session management method, the SMF can establish and register a group-level session to provide a group-level unified control capability, where for the various control plane entities, the group information is delivered to the SMF only once to perform session management control on the designated virtual network group associated with the SMF, so that group-level session control, such as b and width limitation of multicast and broadcast, group-level flow guiding rules, charging and the like, can be performed for the whole group, messages at the N7 and N40 interfaces are reduced, the group processing performance is improved, while the control capability of the group-level session is addressed, and user management of enterprise groups by operators and enterprises is optimized.

Figure 11:
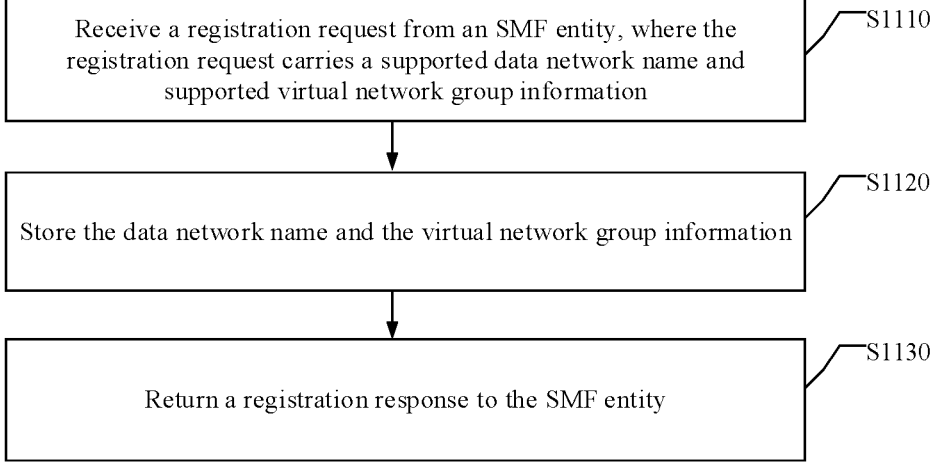
FIG. 11 shows a schematic flowchart of a session management method according to another embodiment of the present application.

FIG. 11 is a schematic flowchart illustrating a session management method according to another embodiment of the present application. As shown in FIG. 11, the session management method may include the following operations S1110 to S1130.

At operation S1110, receiving a registration request from a session management function (SMF) entity, where the registration request carries a supported data network name and supported virtual network group information.

At operation S1120, storing the data network name and the virtual network group information.

At operation S1130, returning a registration response to the SMF entity.

According to the session management method in the embodiments of the present application, the GMF entity can register the SMF entity that is powered on or updated in configuration, and implement registration management of the virtual network group supported by the SMF.

In some embodiments, after the operation S1130, the session management method further includes the following operations S1140 to S1160.

At operation S1140, receiving an SMF discovery request from an access and mobility management function (AMF) entity.

At operation S1150, determining an optimal SMF according to the stored data network name and virtual network group information.

At operation S1160, returning an SMF discovery response to the AMF entity, where the SMF discovery response carries SMF information of the optimal SMF.

According to the session management method in the embodiments of the present application, when the SMF entity is subsequently discovered from the GMF entity by the AMF entity, the GMF entity only needs to determine an optimal SMF according to the data network name and the stored virtual network group information, thereby improving the group processing performance and meeting the service requirement of unified control of the group-level sessions.

FIG. 12 shows a schematic flowchart of a session management method according to another embodiment of the present application. As shown in FIG. 12, the session management method may include the following operations S1210 to S1240.

At operation S1210, receiving a group-level session establishment request from a session management function (SMF) entity, where the group-level session establishment request carries group information.

At operation S1220, performing session authorization for the virtual network group according to the group information.

At operation S1230, returning, in a case where the authorization is successful, a group-level session establishment success response.

At operation S1240, returning, in a case where the authorization fails, a group-level session establishment failure response and carrying a cause value in the session establishment failure response.

According to the session management method in the embodiments of the present application, the PCF establishes the group-level session policy control in response to the request from the SMF entity, thereby achieving a group unified session management policy.

In some embodiments, after the operation S1230, the session management method may further include the following operation S1250. At operation S1250, sending a policy change notification to the SMF entity according to an instruction of an application entity. The policy change notification carries the group information and changed session policy information, and the policy change notification is used for notifying the virtual network group to modify the group-level session of the virtual network group.

In the embodiment of the present application, while sending the policy change notification to the SMF entity, the PCF instructs the SMF, via the carried group information, to perform unified session policy modification on the virtual network group so that the session policy modification can be performed for the whole group, thereby reducing messages sent from the interface, improving the group processing performance, while addressing the control capability of the group-level session and optimizing user management of enterprise groups by operators and enterprises.

FIG. 13 shows a schematic flowchart of a session management method according to another embodiment of the present application. As shown in FIG. 13, the session management method may include the following operations S1310 to S1330.

At operation S1310, receiving a group session registration request from a session management function (SMF) entity, where the group session registration request carries group information and group session information of a virtual network group.

At operation S1320, storing the group information and the group session information of the virtual network group.

At operation S1330, returning a group session registration success response to the SMF entity.

According to the session management method in the embodiments of the present application, in response to the group session registration request from the SMF entity, the UDM performs group session registration for the virtual network group requested by the SMF entity, thereby achieving a group unified session management policy.

In some embodiments, after the operation S1320, the session management method further includes the following operations S1340 to S1350.

At operation S1340, receiving a group session information acquisition request from an access and mobility management function (AMF) entity.

At operation S1350, returning a group session information acquisition response to the AMF entity, where the group session information acquisition response carries the group session information of the virtual network group.

In the embodiment of the present application, the UDM sends the group session information of the virtual network group to the AMF entity, so that when a new user accesses the LAN, the AMF discovers a serving SMF via the UDM, and obtains the group session information of the virtual network group which the new user accesses, thereby optimizing user management of enterprise groups by operators and enterprises.

FIG. 14 shows a schematic flowchart of a session management method according to another embodiment of the present application. As shown in FIG. 14, the session management method is applicable to a charging function (CHF) entity, and may include the following operations S1410 to S1430.

At operation S1410, receiving a group-level charging session establishment request from a session management function (SMF) entity, where the group-level charging session establishment request carries group information of a virtual network group.

At operation S1420, performing group-level session charging control for the virtual network group.

At operation S1430, returning a group-level charging session establishment response, where the group-level charging session establishment response carries a charging control result.

According to the session management method in the embodiments of the present application, in response to the group-level charging session establishment request from the SMF entity, the CHF performs group-level session charging control for the virtual network group, so that the group-level session charging control is performed for the whole group, and the group processing performance and the control capability of the group-level session are improved.

In some embodiments, after the operation S1420, the session management method further includes the following operations S1440 to S1450.

At operation S1440, sending a policy modify notification request to an access and mobility management function (AMF) entity, where the policy modify notification request carries the group information and group-level quota modify policy information.

At operation S1450, receiving a policy modify notification response from the SMF entity to obtain an execution result of the group-level quota modify policy information carried in the policy modify notification response.

In the embodiment of the present application, when the group-level quota is to be modified for the virtual network group, the group information is delivered to the SMF only once, which enables the charging policy modification to be performed for the whole group, thereby reducing the difficulty in group charging control, achieving group unified charging policy and control, and meeting the charging service requirement of unified control of the group-level sessions.

The following describes various control plane entities in detail according to embodiments of the present application with reference to the accompanying drawings.

FIG. 15 shows a schematic structural diagram of an SMF entity according to an embodiment of the present application. As shown in FIG. 15, the session management function (SMF) entity may include the following modules.

A sending module 1510 is configured to send, on the basis of a service requirement, a group-level session management request to a control plane entity, where the group-level session management request carries group information for representing a virtual network group that requires group-level session management.

A receiving module 1520 is configured to receive a response message returned by the control plane entity in response to the group-level session management request.

A management module 1530 is configured to perform, according to content carried in the response message, corresponding session service management on the virtual network group.

In some embodiments, the sending module 1510 is further configured to initiate a registration request to a group management function (GMF) entity before sending the group-level session management request to the control plane entity, where the registration request carries a supported data network name and supported virtual network group information; and the receiving module 1520 is further configured to receive a registration response returned by the GMF entity in response to the registration request.

In some embodiments, the control plane entity is a policy control function (PCF) entity.

The sending module 1510 is configured to send a group-level session establishment request to the PCF entity, where the group-level session establishment request carries group information for the PCF entity to perform session authorization on the virtual network group.

The receiving module 1520 is configured to receive a group-level session establishment success response returned by the PCF entity in response to the group-level session establishment request; where the group-level session establishment success response carries group session policy information.

The management module 1530 is configured to execute the group session policy information to establish a group-level session for the virtual network group; and the sending module 1510 is further configured to return a policy execution response for executing the group session policy information to the PCF entity.

In some embodiments, the receiving module 1520 is further configured to, after receiving the response message returned by the control plane entity in response to the group-level session management request, receive a group-level session establishment failure response returned by the PCF entity in response to the group-level session establishment request, where the group-level session establishment failure response carries a cause value; and a cause determining module is configured to determine a cause for the group-level session establishment failure according to the cause value.

In some embodiments, after the management module 1530 is configured to establish the group-level session for the virtual network group, the receiving module 1520 is further configured to receive a policy change notification sent from the PCF entity, where the policy change notification carries changed session policy information, and the policy change notification is a notification message sent from the PCF entity according to an instruction of an application entity; the management module 1530 is further configured to execute the changed session policy information to modify the group-level session for the virtual network group; and the sending module 1510 is further configured to return a policy execution response for executing the changed session policy information to the PCF entity.

In some embodiments, the control plane entity is a unified data management function (UDM) entity; the sending module 1510 is configured to send a group session registration request to the UDM entity, where the group session registration request carries the group information and group session information, so that when a new user equipment accesses the virtual network group, an access and mobility management function (AMF) obtains, via the UDM entity, the group session information of the virtual network group and discovers a serving SMF entity; and the receiving module 1520 is configured to receive a group session registration success response sent from the UDM entity in response to the group session registration request.

In some embodiments, the control plane entity is a charging function (CHF) entity; the sending module 1510 is configured to send a group-level charging session establishment request to the CHF entity, where the group-level charging session establishment request carries the group information, and the group-level charging session is used for requesting the CHF entity to perform charging control on the group-level session of the virtual network group; and the receiving module 1520 is configured to receive a group-level charging session establishment response returned by the CHF entity in response to the group-level charging session establishment request.

In some embodiments, the receiving module 1520 is further configured to, after receiving the group-level charging session establishment response returned by the CHF entity in response to the group-level charging session establishment request, receive a policy modify notification request sent from the CHF entity, where the policy modify notification request carries the group information and group-level quota modify policy information; the management module 1530 is further configured to execute the group-level quota modify policy information on the group-level session of the virtual network group; and the sending module 1510 is further configured to return a policy modify notification response to the CHF entity, where the policy modify notification response carries an execution result of the group-level quota modify policy information.

The SMF entity according to the embodiments of the present application can send, on the basis of a service requirement, a group-level session management request to a control plane entity, where the group-level session management request carries group information so that the session management can be performed for the whole group, thereby meeting the service requirement of unified control of the group-level sessions, reducing the difficulty in group control and messages at the N7 and N40 interfaces, and achieving the effect of improving the group processing performance.

FIG. 16 shows a schematic structural diagram of a GMF entity according to an embodiment of the present application. As shown in FIG. 16, the group management function (GMF) entity may include the following modules.

A receiving module 1610 is configured to receive a registration request from a session management function (SMF) entity, where the registration request carries a supported data network name and supported virtual network group information.

A storage module 1620 is configured to store the data network name and the virtual network group information.

A sending module 1630 is configured to return a registration response to the SMF entity.

In some embodiments, after returning the registration response to the SMF entity, the receiving module 1610 is further configured to receive an SMF discovery request from an access and mobility management function (AMF) entity; the storage module 1620 is further configured to determine an optimal SMF according to the stored data network name and virtual network group information; and the sending module 1630 is further configured to return an SMF discovery response to the AMF entity, where the SMF discovery response carries SMF information of the optimal SMF.

The GMF entity according to the embodiments of the present application can register the SMF entity that is powered on or updated in configuration, and implement registration management of the virtual network group supported by the SMF.

FIG. 17 shows a schematic structural diagram of a PCF entity according to an embodiment of the present application. As shown in FIG. 17, the policy control function (PCF) entity may include the following modules.

A receiving module 1710 is configured to receive a group-level session establishment request from a session management function (SMF) entity, where the group-level session establishment request carries group information of a virtual network group.

An authorization module 1720 is configured to perform session authorization for the virtual network group according to the group information.

A sending module 1730 is configured to return, in a case where the authorization is successful, a group-level session establishment success response; and return, in a case where the authorization fails, a group-level session establishment failure response and carry a cause value in the session establishment failure response.

In some embodiments, after returning the group-level session establishment success response, the sending module 1730 is further configured to send a policy change notification to the SMF entity according to an instruction of an application entity. The policy change notification carries the group information and changed session policy information, and the policy change notification is used for notifying the virtual network group to modify the group-level session of the virtual network group.

The PCF according to the embodiments of the present application can establish the group-level session policy control in response to the request from the SMF entity, thereby achieving a group unified session management policy.

Figure 18:
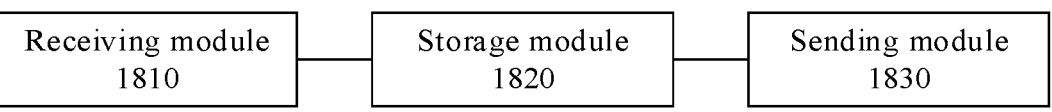
FIG. 18 shows a schematic structural diagram of a UDM entity according to an embodiment of the present application.

FIG. 18 shows a schematic structural diagram of a UDM entity according to an embodiment of the present application. As shown in FIG. 18, the unified data management function (UDM) entity may include the following modules.

A receiving module 1810 is configured to receive a group session registration request from a session management function (SMF) entity, where the group session registration request carries group information and group session information of a virtual network group.

A storage module 1820 is configured to store the group information and the group session information of the virtual network group.

A sending module 1830 is configured to return a group session registration success response to the SMF entity.

In some embodiments, after storing the group information and the group session information of the virtual network group, the receiving module 1810 is further configured to receive a group session information acquisition request from an access and mobility management function (AMF) entity; the sending module 1830 is further configured to return a group session information acquisition response to the AMF entity, where the group session information acquisition response carries the group session information of the virtual network group.

The UDM entity according to the embodiments of the present application can, perform group session registration for the virtual network group requested by the SMF entity in response to the group session registration request from the SMF entity, thereby achieving a group unified session management policy.

Figure 19:
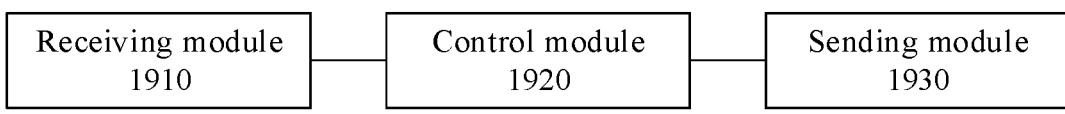
FIG. 19 shows a schematic structural diagram of a CHF entity according to an embodiment of the present application.

FIG. 19 shows a schematic structural diagram of a CHF entity according to an embodiment of the present application. As shown in FIG. 19, the charging function (CHF) entity may include the following modules.

A receiving module 1910 is configured to receive a group-level charging session establishment request from a session management function (SMF) entity, where the group-level charging session establishment request carries group information of a virtual network group.

A control module 1920 is configured to perform group-level session charging control for the virtual network group.

A sending module 1930 is configured to return a group-level charging session establishment response, where the group-level charging session establishment response carries a charging control result.

In some embodiments, after returning the group-level charging session establishment response, the sending module 1930 is further configured to send a policy modify notification request to an access and mobility management function (AMF) entity, where the policy modify notification request carries the group information and group-level quota modify policy information; and the receiving module 1910 is further configured to receive a policy modify notification response from the SMF entity to obtain an execution result of the group-level quota modify policy information carried in the policy modify notification response.

The CHF entity according to the embodiments of the present application can perform group-level session charging control for the virtual network group in response to the group-level charging session establishment request from the SMF entity, so that the group-level session charging control is performed for the whole group, and the group processing performance and the control capability of the group-level session are improved.

In practical application scenarios, unified policy control may be implemented on the LAN services. For example, the LAN services are directed into the same DN data network or have a shared package. Optionally, unified charging control may be also implemented on the LAN services. For example, the group is charged directly and uniformly by simplifying differentiated control policies and charging requirements of different operators/enterprises.

By means of the session management method, the entity, the network device and the storage medium provided in the embodiments of the present application, the difficulty in group control can be reduced, group unified policy, charging control and the like can be achieved, and the service requirement of unified control of the group-level sessions can be met, while the 5GC network is fully utilized, and application of 5G LAN services is accelerated.

It should be noted that the present disclosure is not limited to the specific configurations and processing described in the above embodiments and shown in the figures. For convenience and simplicity of description, detailed description of a known method is omitted here, and for the specific working processes of the system, the modules and the units described above, reference may be made to corresponding processes in the foregoing method embodiments, which are not repeated here.

Figure 20:
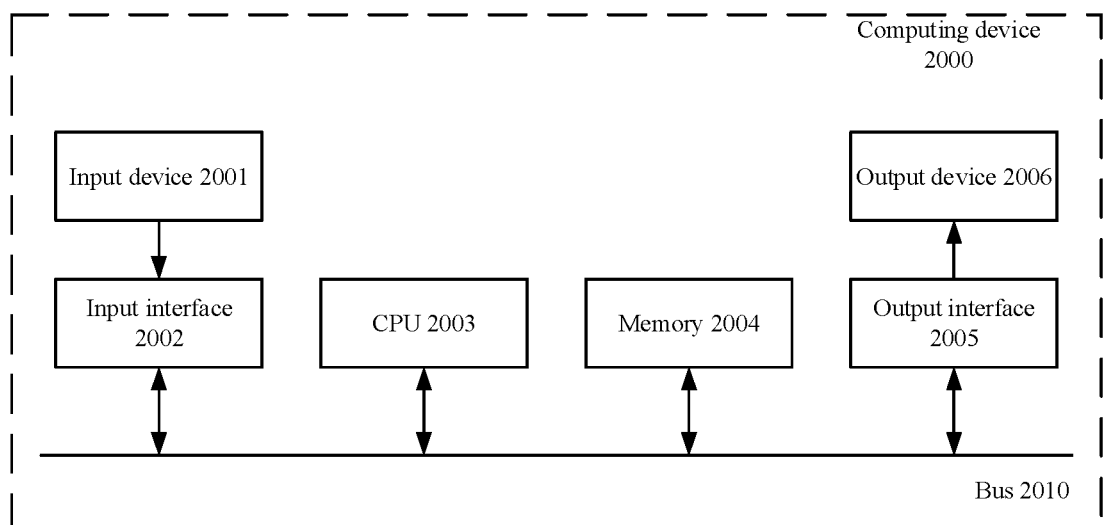
FIG. 20 is a block diagram illustrating an exemplary hardware architecture of a computing device capable of implementing a session management method and a control plane entity according to embodiments of the present application.

FIG. 20 is a block diagram illustrating an exemplary hardware architecture of a computing device capable of implementing a session management method and a control plane entity according to an embodiment of the present application.

As shown in FIG. 20, the computing device 2000 includes an input device 2001, an input interface 2002, a central processing unit 2003, a memory 2004, an output interface 2005, and an output device 2006. The input interface 2002, the central processing unit 2003, the memory 2004, and the output interface 2005 are connected to each other via a bus 2010, and the input device 2001 and the output device 2006 are connected to the bus 2010 via the input interface 2002 and the output interface 2005, respectively, and further connected to other components of the computing device 2000.

Specifically, the input device 2001 receives input information from the outside, and transmits the input information to the central processing unit 2003 through the input interface 2002; the central processing unit 2003 processes the input information based on computer-executable instructions stored in the memory 2004 to generate output information, stores the output information temporarily or permanently in the memory 2004, and then transmits the output information to the output device 2006 through the output interface 2005; and the output device 2006 outputs output information outside of the computing device 2000 for use by a user.

In an embodiment. The computing device shown in FIG. 20 may be implemented as a network device, which may include: a memory configured to store a program; and a processor configured to execute the program stored on the memory to implement the session management method described in any of the above embodiments.

The above are merely exemplary embodiments of the present application and not intended to limit the scope of the present application. In general, the various embodiments of the present application may be implemented in hardware or special purpose circuits, software, logic or any combination thereof. For example, some aspects may be implemented in hardware, while other aspects may be implemented in firmware or software which may be executed by a controller, a microprocessor or any other computing device, although the present application is not limited thereto.

Embodiments of the present application may be implemented by a data processor of a mobile device executing computer program instructions, for example, in a processor entity, or by hardware, or by a combination of software and hardware. The computer program instructions may be assembler instructions, instruction set architecture (ISA) instructions, machine instructions, machine-related instructions, microcodes, firmware instructions, state setting data, or source or object codes written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented in any suitable data storage technology, such as but not limited to, read only memories (ROMs), random access memories (RAMs), optical storage devices or systems (digital versatile discs (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field programmable gate arrays (FGPAs), and processors based on multi-core processor architecture.

The foregoing has provided by way of exemplary and non-limiting examples a detailed description of exemplary embodiments of the present application. Various modifications and adaptations to the foregoing embodiments may become apparent to those skilled in the art in view of the accompanying drawings and the appended claims, without departing from the scope of the present disclosure. Accordingly, the proper scope of the present application is to be determined according to the claims.

What is claimed is:

1. A session management method performed by a session management function (SMF) entity, comprising:

sending, on the basis of a service requirement, a group-level session management request to a control plane entity, wherein the group-level session management request carries group information for representing a virtual network group that requires group-level session management;

receiving a response message returned by the control plane entity in response to the group-level session management request; and performing, according to content carried in the response message, corresponding session service management on the virtual network group, wherein before sending, on the basis of the service requirement, the group-level session management request to the control plane entity, the method further comprises:

initiating a registration request to a group management function (GMF) entity, wherein the registration request carries a supported data network name and supported virtual network group information; and receiving a registration response returned by the GMF entity in response to the registration request.

2. The method according to claim 1, wherein the control plane entity is a policy control function (PCF) entity;

sending, on the basis of the service requirement, the group-level session management request to the control plane entity comprises: sending a group-level session establishment request to the PCF entity, wherein the group-level session establishment request carries group information for the PCF entity to perform session authorization on the virtual network group;

receiving the response message returned by the control plane entity in response to the group-level session management request comprises: receiving a group-level session establishment success response returned by the PCF entity in response to the group-level session establishment request, wherein the group-level session establishment success response carries group session policy information; and performing, according to the content carried in the response message, corresponding session group service management on the virtual network group comprises:

executing the group session policy information to establish a group-level session for the virtual network group; and returning a policy execution response for executing the group session policy information to the PCF entity.

3. The method according to claim 2, wherein after receiving the response message returned by the control plane entity in response to the group-level session management request, the method further comprises:

receiving a group-level session establishment failure response which is returned by the PCF entity in response to the group-level session establishment request, wherein the group-level session establishment failure response carries a cause value; and determining a cause for the group-level session establishment failure according to the cause value.

4. The method according to claim 2, wherein after establishing the group-level session for the virtual network group, the method further comprises:

receiving a policy change notification sent from the PCF entity, wherein the policy change notification carries changed session policy information, and the policy change notification is a notification message sent from the PCF entity according to an instruction of an application entity;

executing the changed session policy information to modify the group-level session for the virtual network group; and returning a policy execution response for executing the changed session policy information to the PCF entity.

5. The method according to claim 1, wherein the control plane entity is a unified data management function (UDM) entity;

sending, on the basis of the service requirement, the group-level session management request to the control plane entity comprises:

sending a group session registration request to the UDM entity, wherein the group session registration request carries the group information and group session information, so that when a new user equipment accesses the virtual network group, an access and mobility management function (AMF) entity obtains, via the UDM entity, the group session information of the virtual network group and discovers a serving SMF entity; and receiving the response message returned by the control plane entity in response to the group-level session management request comprises:

receiving a group session registration success response sent from the UDM entity in response to the group session registration request.

6. The method according to claim 1, wherein the control plane entity is a charging function (CHF) entity;

sending, on the basis of the service requirement, the group-level session management request to the control plane entity comprises:

sending a group-level charging session establishment request to the CHF entity, wherein the group-level charging session establishment request carries the group information, and the group-level charging session is used for requesting the CHF entity to perform charging control on the group-level session of the virtual network group; and receiving the response message returned by the control plane entity in response to the group-level session management request comprises:

receiving a group-level charging session establishment response returned by the CHF entity in response to the group-level charging session establishment request.

7. The method according to claim 6, wherein after receiving the group-level charging session establishment response returned by the CHF entity in response to the group-level charging session establishment request, the method further comprises:

receiving a policy modify notification request sent from the CHF entity, wherein the policy modify notification request carries the group information and group-level quota modify policy information;

executing the group-level quota modify policy information on the group-level session of the virtual network group; and returning a policy modify notification response to the CHF entity, wherein the policy modify notification response carries an execution result of the group-level quota modify policy information.

8. A network device, comprising:

one or more processors; and a memory having one or more programs stored thereon which, when executed by the one or more processors, cause the one or more processors to implement the method according to claim 1.

9. A non-transitory computer-readable storage medium having a computer program stored thereon which, when executed by a processor, causes the method according to claim 1 to be implemented.

* * * * *